(12) United States Patent
Durvasula et al.

(10) Patent No.: US 11,481,553 B1
(45) Date of Patent: Oct. 25, 2022

(54) INTELLIGENT KNOWLEDGE MANAGEMENT-DRIVEN DECISION MAKING MODEL

(71) Applicant: MCKINSEY & COMPANY, INC., New York, NY (US)

(72) Inventors: Sastry Vsm Durvasula, Phoenix, AZ (US); Rares Almasan, Phoenix, AZ (US); Sriram Venkatesan, Princeton Junction, NJ (US); Suraj Sharma, Sammamish, WA (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 17/697,848

(22) Filed: Mar. 17, 2022

(51) Int. Cl.
  *G06F 17/00* (2019.01)
  *G06F 40/279* (2020.01)
  *G06N 5/02* (2006.01)

(52) U.S. Cl.
  CPC .......... *G06F 40/279* (2020.01); *G06N 5/022* (2013.01)

(58) Field of Classification Search
  None
  See application file for complete search history.

(56) References Cited

U.S. PATENT DOCUMENTS

| | | | | |
|---|---|---|---|---|
| 9,189,742 | B2 * | 11/2015 | London | G06N 7/005 |
| 9,336,302 | B1 * | 5/2016 | Swamy | G06F 16/285 |
| 10,432,742 | B2 * | 10/2019 | Gelfenbeyn | H04L 67/55 |
| 10,778,793 | B2 * | 9/2020 | Gelfenbeyn | H04L 51/02 |
| 2005/0203924 | A1 * | 9/2005 | Rosenberg | G06F 16/338 |
| 2008/0183691 | A1 * | 7/2008 | Kwok | G06F 16/313 |
| | | | | 707/999.005 |
| 2020/0125590 | A1 * | 4/2020 | Ferrentino | G06F 16/288 |
| 2021/0258321 | A1 * | 8/2021 | Vegulla | G06N 5/04 |

* cited by examiner

*Primary Examiner* — Satwant K Singh
(74) *Attorney, Agent, or Firm* — Marshall, Gerstein & Borun LLP; Randall G. Rueth

(57) ABSTRACT

A method includes receiving user inputs; receiving codified knowledge management information; receiving engine data; and processing the user inputs, the codified knowledge management information and engine data using a trained machine learning model to generate a living document. A computing system includes one or more processors; and a memory comprising instructions that, when executed, cause the computing system to: receive user inputs; receive codified knowledge management information; receive engine data; and process the user inputs, the codified knowledge management information and engine data using a trained machine learning model to generate a living document. A non-transitory computer-readable storage medium includes executable instructions that, when executed by a processor, cause a computer to: receive user inputs; receive codified knowledge management information; receive engine data; and process the user inputs, the codified knowledge management information and engine data using a trained machine learning model to generate a living document.

20 Claims, 12 Drawing Sheets

INTELLIGENT KNOWLEDGE MANAGEMENT-DRIVEN DECISION MAKING MODEL

FIELD OF THE DISCLOSURE

The present disclosure generally directed to knowledge management-driven decision-making models and, more specifically, to methods and systems for using machine learning to construct and update one or more living documents.

BACKGROUND

Every company has their own way of creating and storing information. Over time, thousands of projects are worked upon by multiple people and plethora of information of the projects collected in various places. Extracting and using this information is very time consuming and not properly organized to utilize the extracted information, which leads to rework on similar projects, causing additional costs and time. Internal and external information is not organized, and comes in complex formats that are time consuming to collect and organize. Information available internally at the organization and externally through various resources like videos, websites, etc. is complex, time consuming, non-standardized and imposes other costs.

Consultants rely on leading documents that may fall out of date quickly. Yet, a consultancy drives solutions for its customers, internal and external. For example, cloud services are a large undertaking for any firm. The firm must build the cloud, migrate to the cloud, and maintain the cloud, not to mention continuing to perform upgrades and maintenance. All of this occurs in a very complex industry and a fast-evolving technology space. Many companies are tech-savvy, but lacking in business expertise. Other companies are in a very specific business industry but lack technical acumen to navigate the ever-changing technology landscape.

Thus, there is a need for improved techniques for automated identification of new knowledge and updating of knowledge management information.

BRIEF SUMMARY

In one aspect, a computer-implemented method for improving efficiency and consistency of knowledge management living documents includes (i) receiving, via one or more processors, one or more user inputs including one or more problems and associated respective parameters and/or variables; (ii) receiving, via one or more processors, codified knowledge management information from a knowledge management environment; (iii) receiving, via one or more processors, from one or more engines, respective engine data; and (iv) processing, via one or more processors, the one or more user inputs, the codified knowledge management information and one or more of the respective engine data using one or more trained machine learning models in a knowledge artificial intelligence model to generate an output including one or more living documents.

In another aspect, a computing system for improving the efficiency and consistency of knowledge management living documents includes one or more processors; and a memory comprising instructions that, when executed, cause the computing system to: (i) receive, via one or more processors, one or more user inputs including one or more problems and associated respective parameters and/or variables; (ii) receive, via one or more processors, codified knowledge management information from a knowledge management environment; (iii) receive, via one or more processors, from one or more engines, respective engine data; and (iv) process, via one or more processors, the one or more user inputs, the codified knowledge management information and one or more of the respective engine data using one or more trained machine learning models in a knowledge artificial intelligence model to generate an output including one or more living documents.

In yet another aspect, a non-transitory computer-readable storage medium includes executable instructions that, when executed by a processor, cause a computer to: (i) receive, via one or more processors, one or more user inputs including one or more problems and associated respective parameters and/or variables; (ii) receive, via one or more processors, codified knowledge management information from a knowledge management environment; (iii) receive, via one or more processors, from one or more engines, respective engine data; and (iv) process, via one or more processors, the one or more user inputs, the codified knowledge management information and one or more of the respective engine data using one or more trained machine learning models in a knowledge artificial intelligence model to generate an output including one or more living documents.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Overview

The aspects described herein relate to, inter alia, techniques for knowledge management-driven decision-making models and, more specifically, to methods and systems for using machine learning to construct and update one or more living documents, and for automated client advising based on the one or more living documents. In some aspects of the present techniques, a living document is continuously improved using knowledge gained while consultants deal with client problems of many types (not limited to any particular application or technology sector). The present techniques may be used to provide knowledge management-as-a-service (KMaaS), in some aspects.

Exemplary Computing Environment

Figure 1:
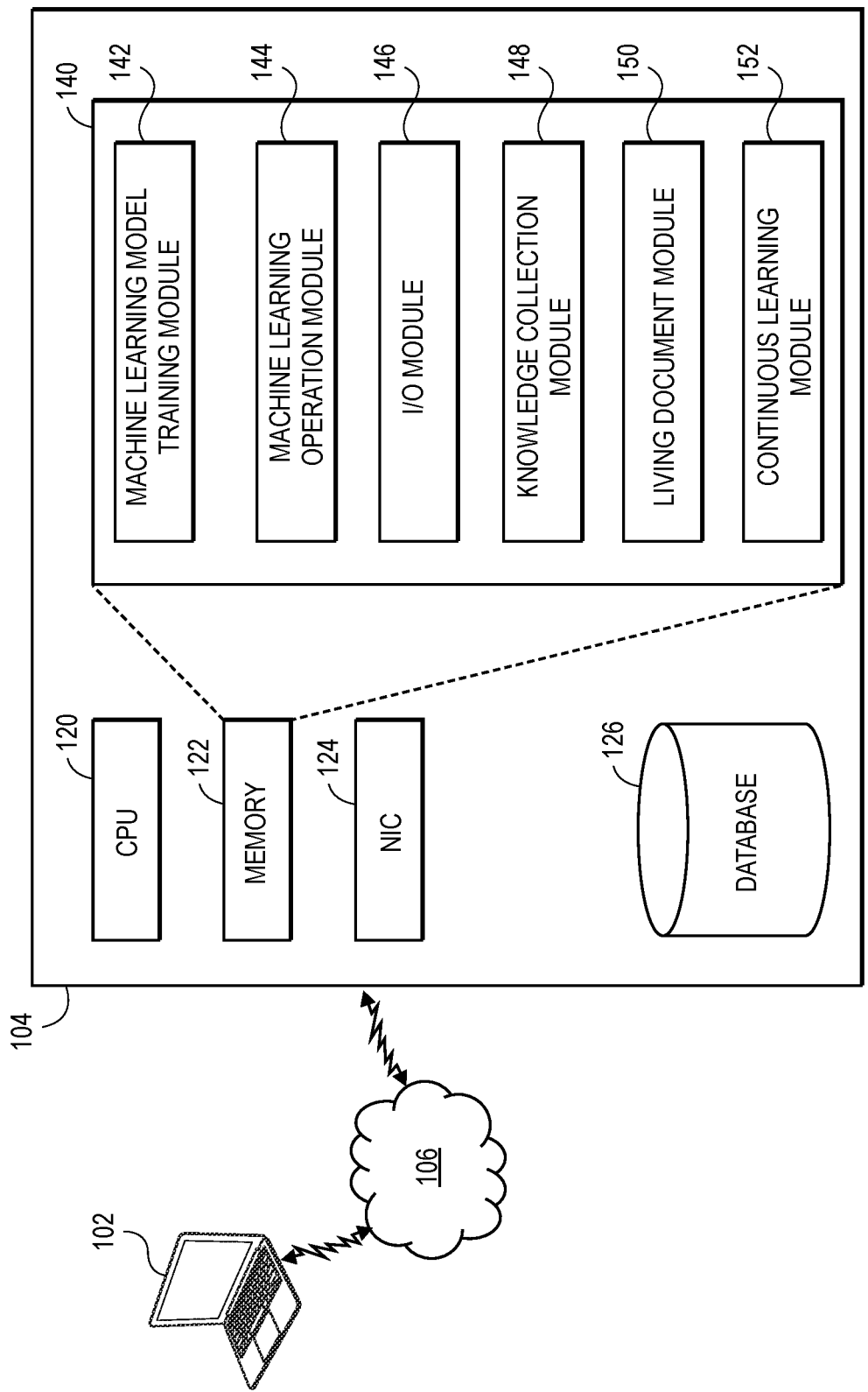
FIG. 1 depicts a computing environment in which artificial intelligence (AI)-based living document generation and/or updating may be performed, in accordance with various aspects discussed herein.

FIG. 1 depicts a computing environment 100 in which artificial intelligence (AI)-based living document generation and/or updating may be performed, in accordance with various aspects discussed herein. In the example aspect of FIG. 1, computing environment 100 includes a client 102, which may comprise one or more computers. In various aspects, client(s) 102 comprise multiple computers, which may comprise multiple, redundant or replicated client computers accessed by one or more users. The example aspect of FIG. 1 further includes one or more servers 104 that may include one or more servers. In further aspects, the servers 104 may be implemented as cloud-based servers, such as a cloud-based computing platform. For example, servers 104 may be any one or more cloud-based platform(s) such as MICROSOFT AZURE, AMAZON AWS, Terraform, etc. The environment 100 may further include a current computing environment, representing a current computing environment (e.g., on premises) of a customer and/or future computing environment, representing a future computing environment (e.g., a cloud computing environment, multi-cloud environment, etc.) of a customer. The environment 100 may further include an electronic network 106 communicatively coupling other aspects of the environment 100. For example, the servers 104 may access the current computing environment (not depicted) and/or the future computing environment (not depicted). For example, the servers 104 may establish one or more network socket connections to the future computing environment and/or the current network environment.

As described herein, in some aspects, servers 104 may perform the functionalities as discussed herein as part of a cloud-computing environment or may otherwise communicate with other hardware or software components within one or more cloud computing environments to send, retrieve, or otherwise analyze data or information described herein. For example, in aspects of the present techniques, the current computing environment may comprise a customer on-premise computing environment, a multi-cloud computing environment, a public cloud-computing environment, a private cloud computing environment, and/or a hybrid cloud-computing environment. For example, the customer may host one or more services in a public cloud-computing environment (e.g., Alibaba Cloud, Amazon Web Services (AWS), Google Cloud, IBM Cloud, Microsoft Azure, etc.). The public cloud-computing environment may be a traditional off-premise cloud (i.e., not physically hosted at a location owned/controlled by the customer). Alternatively, or in addition, aspects of the public cloud may be hosted on-premise at a location owned/controlled by the customer. The public cloud may be partitioned using virtualization and multi-tenancy techniques, and may include one or more of the customer's IaaS and/or PaaS services.

In some aspects of the present techniques, the current computing environment of the customer may comprise a private cloud that includes one or more cloud computing resources (e.g., one or more servers, one or more databases, one or more virtual machines, etc.) dedicated to the customer's exclusive use. In some aspects, the private cloud may be distinguished by its isolation to hardware exclusive to the customer's use. The private clouds may be located on-premise of the customer, or constructed from off-premise cloud computing resources (e.g., cloud computing resources located in a remote data center). The private clouds may be third-party managed and/or dedicated clouds.

In still further aspects of the present techniques, the current computing environment may comprise a hybrid cloud that includes multiple cloud computing environments communicatively coupled via one or more networks (e.g., the network 106). For example, in a hybrid cloud computing aspect, the current computing environment may include one or more private clouds, one or more public clouds, a bare-metal (e.g., non-cloud based) system, etc. The future computing environment may comprise one or more public clouds, one or more private clouds, one or more bare-metal systems/servers, and/or one or more hybrid clouds. The servers 104 may be implemented as one or more public clouds, one or more private clouds, one or more hybrid clouds, and/or one or more bare-metal systems/servers. For example, the servers 104 may be implemented as a private cloud computing environment that orchestrates the migration of a current computing environment implemented as a first hybrid cloud (e.g., comprising two public clouds and three private clouds) to a future computing environment implemented as a second hybrid cloud (e.g., comprising one public cloud and five private clouds).

The client device 102 may be any suitable device (e.g., a laptop, a smart phone, a tablet, a wearable device, a blade server, etc.). The client device 102 may include a memory and a processor for, respectively, storing and executing one or more modules. The memory may include one or more suitable storage media such as a magnetic storage device, a solid-state drive, random access memory (RAM), etc. A proprietor of the present techniques may access the environment 100 via the client device 102, to access services or other components of the environment 100 via the network 106. A customer, or user, of the environment 100 (e.g., a persona, as discussed herein) may access the environment 100 via another client device 102.

The network 106 may comprise any suitable network or networks, including a local area network (LAN), wide area network (WAN), Internet, or combination thereof. For example, the network 106 may include a wireless cellular service (e.g., 4G). Generally, the network 106 enables bidirectional communication between the client device 102 and the servers 104; the servers 104 and the current computing environment; the servers 104 and the future computing environment; a first client device 102 and a second client device 102; etc. As shown in FIG. 1, servers 104 are communicatively connected, via computer network 106 to the one or more client computing devices 102 via network 106. In some aspects, network 106 may comprise a cellular base station, such as cell tower(s), communicating to the one or more components of the environment 100 via wired/wireless communications based on any one or more of various mobile phone standards, including NMT, GSM, CDMA, UMMTS, LTE, 5G, or the like. Additionally or alternatively, network 106 may comprise one or more routers, wireless switches, or other such wireless connection points communicating to the components of the environment 100 via wireless communications based on any one or more of various wireless standards, including by non-limiting example, IEEE 802.11a/b/c/g (WIFI), the BLUETOOTH standard, or the like.

The one or more servers 104 may include one or more processors 120, one or more computer memories 122, one or more network interface controllers (NICs) 124 and an electronic database 126. The NIC 124 may include any suitable network interface controller(s), and may communicate over the network 106 via any suitable wired and/or wireless connection. The servers 104 may include one or more input device (not depicted) and may include one or more device for allowing a user to enter inputs (e.g., data) into the servers 104. For example, the input device may include a keyboard, a mouse, a microphone, a camera, etc. In some aspects, the input device may be a dedicated client computing device 102 (e.g., located local to or remote to the servers 104). The NIC 124 may include one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 106.

The database 126 may be a relational database, such as Oracle, DB2, MySQL, a NoSQL based database, such as MongoDB, or another suitable database. The database 126 may store data used during training and/or operation of one or more ML/AI models. The database 126 may store runtime data (e.g., a customer response received via the network 106, knowledge management information, etc.). As will be discussed further herein, in some aspects, the environment 100 may interact with other techniques, such as those described in U.S. patent application Ser. No. 17/506,521, entitled "Machine Learning Techniques for Environmental Discovery, Environmental Validation, and Automated Knowledge Repository Generation," and filed Oct. 20, 2021 (hereinafter "the '521 application"); U.S. patent application Ser. No. 17/506,536, entitled "Automated Cloud Data and Technology Solution Delivery Using Machine Learning and Artificial Intelligence Modeling," and filed Oct. 20, 2021 (hereinafter "the '536 application"; U.S. patent application Ser. No. 17/512,743, entitled "Machine Learning Methods and Systems for Cataloging and Making Recommendations Based on Domain-Specific Knowledge," and filed Oct. 28, 2021 (hereinafter "the '743 application"); and Indian Patent Application No. 202121056829, entitled "Artificial Intelligence-Based Use Case Model Recommendation Methods and Systems," filed Dec. 7, 2021 (hereinafter "the '829 application"). The entirety of each of the '521 application, the '536 application, the '743 application and the '829 application is incorporated herein, for all purposes.

The servers 104 may implement client-server platform technology that may interact, via a computer bus of the servers 104 (not depicted), with the memory(s) 122 (including the applications(s), component(s), API(s), data, etc. stored therein) and/or database 126 to implement or perform the machine readable instructions, methods, processes, elements or limitations, as illustrated, depicted, or described for the various flowcharts, illustrations, diagrams, figures, and/or other disclosure herein.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in memory 122 and/or the database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 140, implemented as respective sets of computer-executable instructions (e.g., one or more source code libraries, trained machine learning models such as neural networks, convolutional neural networks, reinforcement learning instructions, etc.) as described herein.

In general, a computer program or computer based product, application, or code (e.g., the model(s), such as machine learning models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

For example, in some aspects, the computing modules 140 may include a ML model training module 142, comprising a set of computer-executable instructions implementing machine learning training, configuration, parameterization and/or storage functionality. The ML model training module 142 may initialize, train and/or store one or more ML models, as discussed herein. The trained ML models and/or respective sets of ML model parameters may be stored in the database 126, which is accessible or otherwise communicatively coupled to the servers 104. The modules 140 may store machine readable instructions, including one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. The ML training module 142 may train one or more ML models (e.g., an artificial neural network). One or more training data sets may be used for model training in the present techniques, as discussed herein. The input data may have a particular shape that may affect the ANN network architecture. The elements of the training data set may comprise tensors scaled to small values (e.g., in the range of (−1.0, 1.0)). In some aspects, a preprocessing layer may be included in training (and operation) which applies principal component analysis (PCA) or another technique to the input data. PCA or another dimensionality reduction technique may be applied during training to reduce dimensionality from a high number to a relatively smaller number. Reducing dimensionality may result in a substantial reduction in computational resources (e.g., memory and CPU cycles) required to train and/or analyze the input data.

In general, training an ANN may include establishing a network architecture, or topology, adding layers including activation functions for each layer (e.g., a "leaky" rectified linear unit (ReLU), softmax, hyperbolic tangent, etc.), loss function, and optimizer. In an aspect, the ANN may use different activation functions at each layer, or as between hidden layers and the output layer. A suitable optimizer may include Adam and Nadam optimizers. In an aspect, a different neural network type may be chosen (e.g., a recurrent neural network, a deep learning neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the artificial neural network may be encoded in an N-dimensional tensor, array, matrix, and/or other suitable data structure. In some aspects, training may be performed by successive evaluation (e.g., looping) of the network, using training labeled training samples. The process of training the ANN may cause weights, or parameters, of the ANN to be created. The weights may be initialized to random values. The weights may be adjusted as the network is successively trained, by using one or more gradient descent algorithms, to reduce loss and to cause the values output by the network to converge to expected, or "learned", values. In an aspect, a regression may be used which has no activation function. Therein, input data may be normalized by mean centering, and a mean squared error loss function may be used, in addition to mean absolute error, to determine the appropriate loss as well as to quantify the accuracy of the outputs.

For example, the ML training module 142 may receive labeled data at an input layer of a model having a networked layer architecture (e.g., an artificial neural network, a convolutional neural network, a deep neural network, etc.) for training the one or more ML models to generate ML models (e.g., the ML models of FIG. 2A, FIG. 2B, 2C, 3A-3C, etc.). The received data may be propagated through one or more connected deep layers of the ML model to establish weights of one or more nodes, or neurons, of the respective layers. Initially, the weights may be initialized to random values, and one or more suitable activation functions may be chosen for the training process, as will be appreciated by those of ordinary skill in the art. The method may include training a respective output layer of the one or more machine learning models. The output layer may be trained to output a prediction, for example. In some aspects, the output layer may include machine learning solutions related to a strategy model, such as a recommending system, a ranking, a clustering, etc.

The data used to train the ANN may include heterogeneous data (e.g., textual data, image data, audio data, etc.). In some aspects, multiple ANNs may be separately trained and/or operated. In some aspects, the present techniques may include using a machine learning framework (e.g., Keras, scikit-learn, etc.) to facilitate the training and/or operation of machine learning models.

In various aspects, an ML model, as described herein, may be trained using a supervised or unsupervised machine learning program or algorithm. The machine learning program or algorithm may employ a neural network, which may be a convolutional neural network, a deep learning neural network, and/or a combined learning module or program that learns in two or more features or feature datasets (e.g., structured data, unstructured data, etc.) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be based on, or otherwise incorporate aspects of one or more machine learning algorithms included as a library or package executed on server(s) 104. For example, libraries may include the TensorFlow based library, the Pytorch library, and/or the scikit-learn Python library.

Machine learning may involve identifying and recognizing patterns in existing data (such as data risk issues, data quality issues, sensitive data, etc.) in order to facilitate making predictions, classifications, and/or identifications for subsequent data (such as using the models to determine or generate a classification or prediction for, or associated with, applying a data governance engine to train a descriptive analytics model).

Machine learning model(s), may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or other processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. In the present techniques, unsupervised learning may be used, inter alia, for natural language processing purposes (e.g., for performing topic modeling of words for mapping of personas, industries, etc.) and to identify scored features that can be grouped to make unsupervised decisions (e.g., numerical k-means).

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques. In various aspects, training the ML models herein may include generating an ensemble model comprising multiple models or sub-models, comprising models trained by the same and/or different AI algorithms, as described herein, and that are configured to operate together.

In some aspects, the computing modules 140 may include a machine learning operation module 144, comprising a set of computer-executable instructions implementing machine learning loading, configuration, initialization and/or operation functionality. The ML operation module 144 may include instructions for storing trained models (e.g., in the electronic database 126, as a pickled binary, etc.). Once trained, a trained ML model may be operated in inference mode, whereupon when provided with de novo input that the model has not previously been provided, the model may output one or more predictions, classifications, etc. as described herein. In an unsupervised learning aspect, a loss minimization function may be used, for example, to teach a ML model to generate output that resembles known output.

The architecture of the ML model training module 142 and the ML operation module 144 as separate modules represent advantageous improvements over the prior art. In conventional computing systems that include multiple machine learning algorithms, for performing various functions, the models are often added to each individual module or set of instructions independent from other algorithms/modules. This is wasteful of storage resources, resulting in significant code duplication. Further, repeating ML model storage in this way may result in redundant retraining of the same model aspects, wasting computational resources. By consolidating ML model training and ML model operation into two respective modules that may be reused by any of the various ML algorithms/modeling suites of the present techniques, waste of storage and computation is avoided. Further, this organization enables computational training work to be organized by a task scheduling module (not depicted), for efficiently allocating computing resources for training and operation, to avoid overloading the underlying system hardware, and to enable training to be performed using distributed computing resources (e.g., via the network 106) and/or using parallel computing strategies.

In some aspects, the computing modules 140 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as computer network 106 and/or the client 102 (for rendering or visualizing) described herein. In some aspects, servers 104 may include a client-server platform technology such as ASP.NET, Java J2EE, Ruby on Rails, Node.js, a web service or online API, responsive for receiving and responding to electronic requests.

The I/O module 146 may further include or implement an operator interface configured to present information to an administrator or operator and/or receive inputs from the administrator and/or operator (e.g., via the client computing device 102). An operator interface may provide a display screen. I/O module 146 may facilitate I/O components (e.g., ports, capacitive or resistive touch sensitive input panels, keys, buttons, lights, LEDs), which may be directly accessible via, or attached to, servers 104 or may be indirectly accessible via or attached to the client device 102. According to some aspects, an administrator or operator may access the servers 104 via the client device 102 to review information, make changes, input training data, initiate training via the ML training module 142, and/or perform other functions (e.g., operation of one or more trained models via the ML operation module 144). In some aspects, the I/O module 146 may include one or more sets of instructions for receiving inputs via a virtual reality interface, a mixed reality interface and/or an augmented reality interface (e.g., via a tablet hardware device, such as the client computing device 102).

In some aspects, the computing modules 140 may include a knowledge collection module 148. The knowledge collection module may include computer-executable instructions for collecting knowledge related to business and technology. In some aspects, the knowledge may be stored in the database 126. The knowledge may be represented in an ontology or other format (e.g., a hierarchical storage format). The knowledge may be indexed and searchable, in some aspects. In some aspects, the knowledge may be stored as a collection of hyperlinked pages that may be traversed.

In some aspects, the computing modules 140 may include a living document module 150. The living document module 150 may include computer-executable instructions for storing, updating and creating living documents. A living document may be an electronic documents (e.g., Microsoft Word documents, LaTeX documents, HTML documents, Python Notebooks, flat files, etc.). In some aspects, the living documents may be represented as code, pseudocode or as structured text (e.g., markdown, reStructuredText, JSON, XML, etc.). The living document module 150 may include instructions for storing, retrieving and updating living documents (e.g., living documents stored in the database 126 and/or in the memory 122).

The continuous learning module 152 may include computer-executable instructions for continuously updating the one or more living documents. Updating the one or more living documents may be performed by modifying elements of the living documents (e.g., paragraphs, tables, headings, images, etc.).

In operation, a user of the client device 102 (e.g., a software engineer or employee of the consultancy) may access the server 104 and train one or more machine learning model using the machine learning model training module 142. For example, the engineer may configure the server 104 to ingest information via the knowledge collection module 148 from data engines, data sources (e.g., internal or external data sources), etc. The engineer may access historical data in the database 126 regarding previously successful consulting projects. The engineer may use the data to train the model to identify new knowledge, and may configure another set of instructions (e.g., the continuous learning module) to perform updates to one or more living documents via the living document module 150, accessing the trained machine learning model to receive output to add to the living document. For example, the engineer may configure the machine learning model to train on historical cloud computing migration projects (e.g., ERP transformations) across many industries. It will be appreciated that the machine learning model training module 142 may be used to train disparate models each directed to narrow industries, in some aspects. The engineer may also train a natural language processing (NLP) model and other models.

A client from a particular industry (e.g., healthcare) may then contract with the consultancy for ERP transformation services. The client may input a problem statement (e.g., "I want to perform and ERP transformation of my HR files.") into the server 104. The server may analyze the user's problem statement via a natural language processing model trained by the machine. The NLP model may identify the problem type (e.g., ERP-transformation) and the source environment parameter (e.g., HR). In some aspects, the server may include instructions for querying additional information from the user. The additional information may be determined based on querying knowledge management information in the database 126, for example, to retrieve codified knowledge management information. For example, an HR source environment may require an HR target environment. However, other source environment types may allow for a different target environment. The server may receive additional information from external engines, such as intelligent could data and technology solutions engine data, smart domain expertise solutions engine data, AI-drive experimentation engine data, and/or more, as discussed herein.

The server may analyze all of the received information using the trained machine learning models, that were trained by the engineer before the client made their request for service. The trained machine learning models may generate a solution for the client, and one or more living documents. The one or more living documents may be existing documents that are provided unmodified, modified or created from scratch, in some aspects. Based on feedback from the client, the server may update the living documents using new information. The server may also asynchronously update the living documents based on information received at any time.

Exemplary AI-Based Knowledge Management Computer-Implemented Methods

Figure 2A:
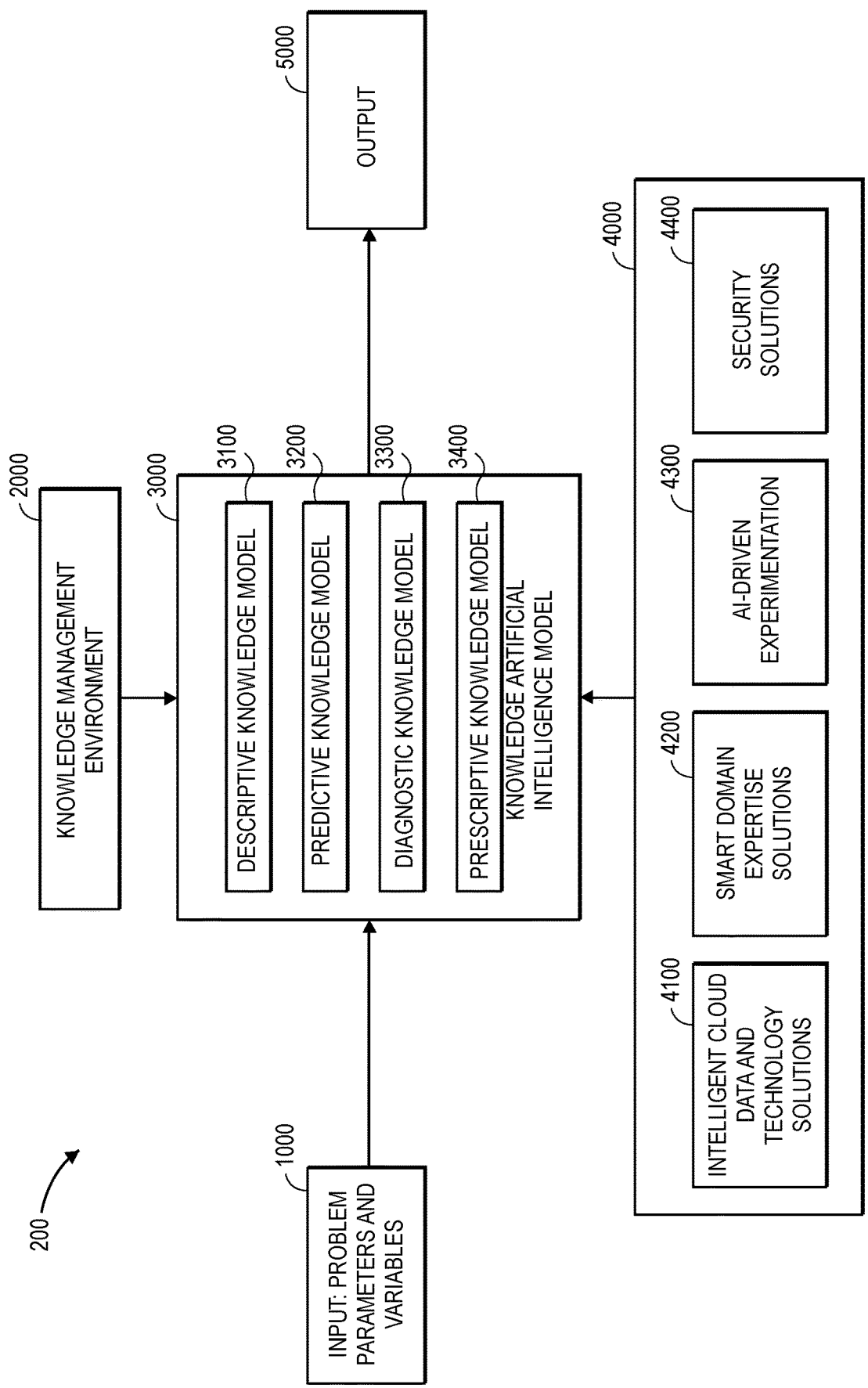
FIG. 2A depicts an exemplary block flow diagram depicting a computer-implemented method for generating one or more living documents using machine learning, according to some aspects.

FIG. 2A depicts an exemplary block flow diagram depicting a computer-implemented method 200 for generating one or more living documents using machine learning, according to some aspects. By generating and/or updating the one or more living documents, the method 200 creates and codifies intelligence in a knowledge management environment. The method may include a knowledge artificial intelligence model that includes one or more trained machine learning models (block 3000). The method 200 may include receiving at the block 3000 user input objectives including one or more problems and associated respective parameters and/or variables (block 1000), as further described below, with respect to FIG. 2B. The method 200 may include receiving at the block 3000 information from a knowledge management environment (block 2000), as further described below, with respect to FIG. 2C. The method 200 may include receiving at the block 3000 output from an output engine (block 4000), as further described below with respect to FIG. 4A, FIG. 4B and FIG. 4C. For example, in some aspects, the method 200 may include receiving machine learning training data and/or data for processing using the trained models (collectively, "engine data") in the block 3000. In some aspects, the method 200 may include receiving the engine data from an intelligent cloud data and technology solutions module (block 4100). In some aspects, the method 200 may include receiving the engine data from a smart domain module expertise solutions module (block 4200). In some aspects, the method 200 may include receiving the engine data from an AI-driven experimentation module (block 4300). In some aspects, the method 200 may include receiving the engine data from a security solutions module (block 4400). Generally, the engine data is codified data (i.e., data that has been mapped to numerical values).

The method 200 may include processing the received user input objectives from block 1000, the information from the knowledge management environment block 2000 and/or the output from the output engine at block 4000 at the block 3000, using the one or more trained machine learning models of block 3000, to generate an output block 5000 that includes one or more living documents.

Figure 2B:
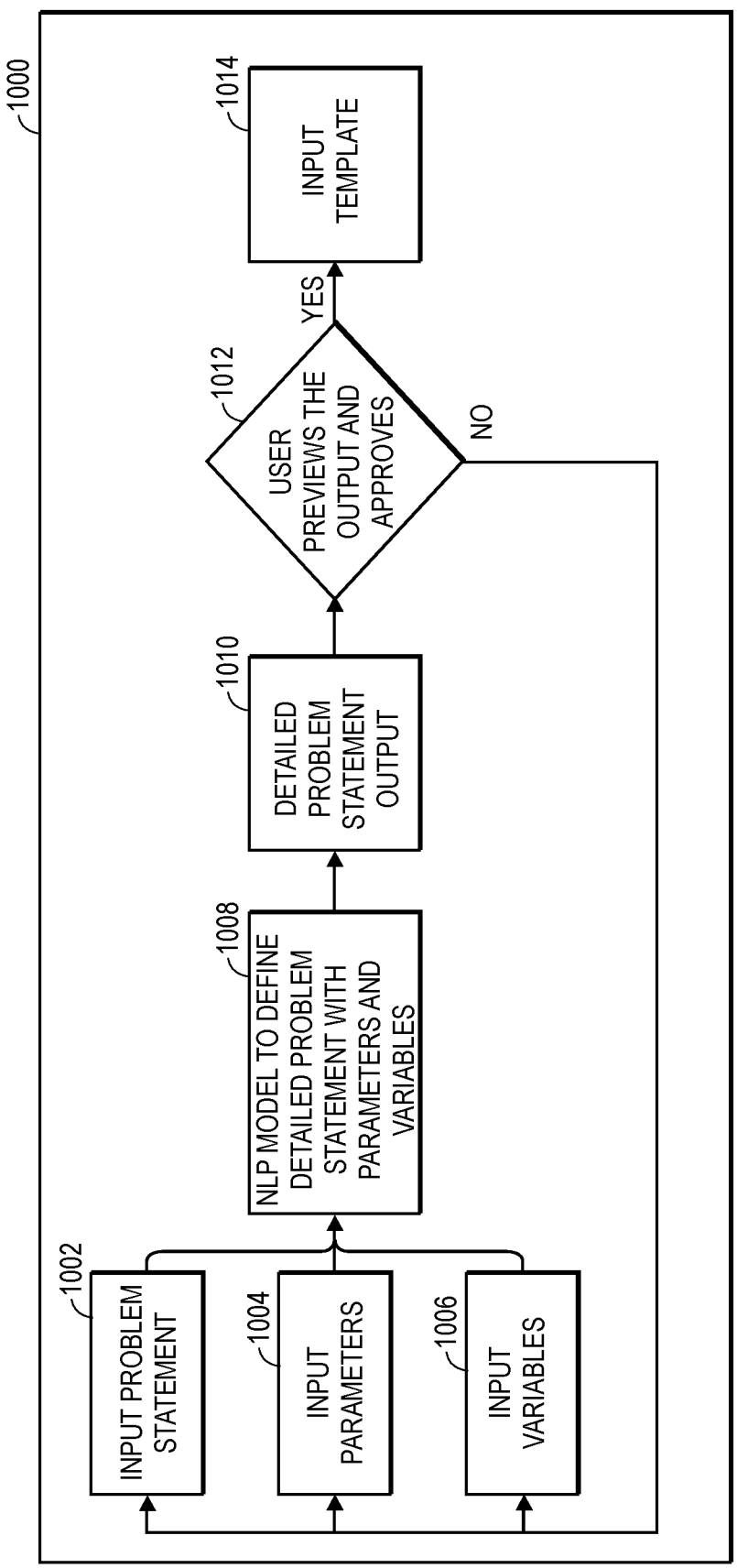
FIG. 2B depicts an exemplary block flow diagram depicting a detail of receiving user input objectives including the one or more problems and the associated respective parameters and/or variables with respect to FIG. 2A, according to some aspects.

FIG. 2B depicts an exemplary block flow diagram depicting a detail of receiving user input objectives including the one or more problems and the associated respective parameters and/or variables at block 1000 of the method 200 of FIG. 2A, according to some aspects. As shown in FIG. 2B, the block 1000 may include receiving user inputs including an input problem statement (block 1002), receiving one or more input parameters (block 1004) and/or receiving one or more input variables (block 1006). For example, the input problem statement may include one or more natural language statements describing a technical problem. A user may interact with the environment 100 via the client 102 to input the user inputs at blocks 1002, 1004 and 1006.

The method 200 may include codifying a problem from an internal or external client at block 1000. The method 200 may include breaking down the problem into domain-related descriptions, categories (e.g., what kind of issue/problems the user is facing in each), technology/not technology categories, etc. The method 200 may translate these descriptions/categories into numerical codes that are input to the block 3000. In particular, the method 200 may include, at block 1000, passing the received user inputs to a natural language processing (NLP) machine learning model to define a detailed problem statement with associated parameters and variables (block 1008). The method 200 may include generating, via the NLP machine learning model at block 1008, details of a business problem and/or a technology problem (block 1010). The user may preview the generated details and confirm whether the details correspond to the user's requirements (block 1012). When the user does not approve of the generated details, flow control pay pass to blocks 1002, 1004 and/or block 1006 to allow the user to revise the input problem statement, input parameters and/or input variables, respectively. When the user approves, the method 200 may include generating an input template (block 1014). Thus, the NLP machine learning model at block 1008 is self-learning and keeps current with the rapidly evolving technologies and solutions to existing problems, by enabling the user to continuously refine the inputs.

At block 1000, the method 200 collects problem information from the user, extracts summaries of problem, and identifies key elements of problem. This may be done, in some aspects, by identifying one or more entities in the problem statement and analyzing those entities using one or more trained machine learning models. For example, the entities may be classified as relating to either business or technology concerns. At block 1000, the method 200 may capture and translate the problem into numerical values (i.e., codify the problem) that can be input into other blocks (e.g., the 3000 block). The present techniques are an advantageous improvement, because the proprietor-consultancy may have an advantage of working with all cloud types, and all problem types, including both tech and business related problems, whereas conventional techniques are more limited. Further, the proprietor-consultancy may possess internal knowledge from own clients and consultants.

It will be appreciated by those of ordinary skill in the art that parameters/variables at block 1000 may include information about the business itself, complexities of the business, relationships within the business, the ecosystem of the problem, etc. These contextual parameters are in addition to the problem itself.

Figure 2C:
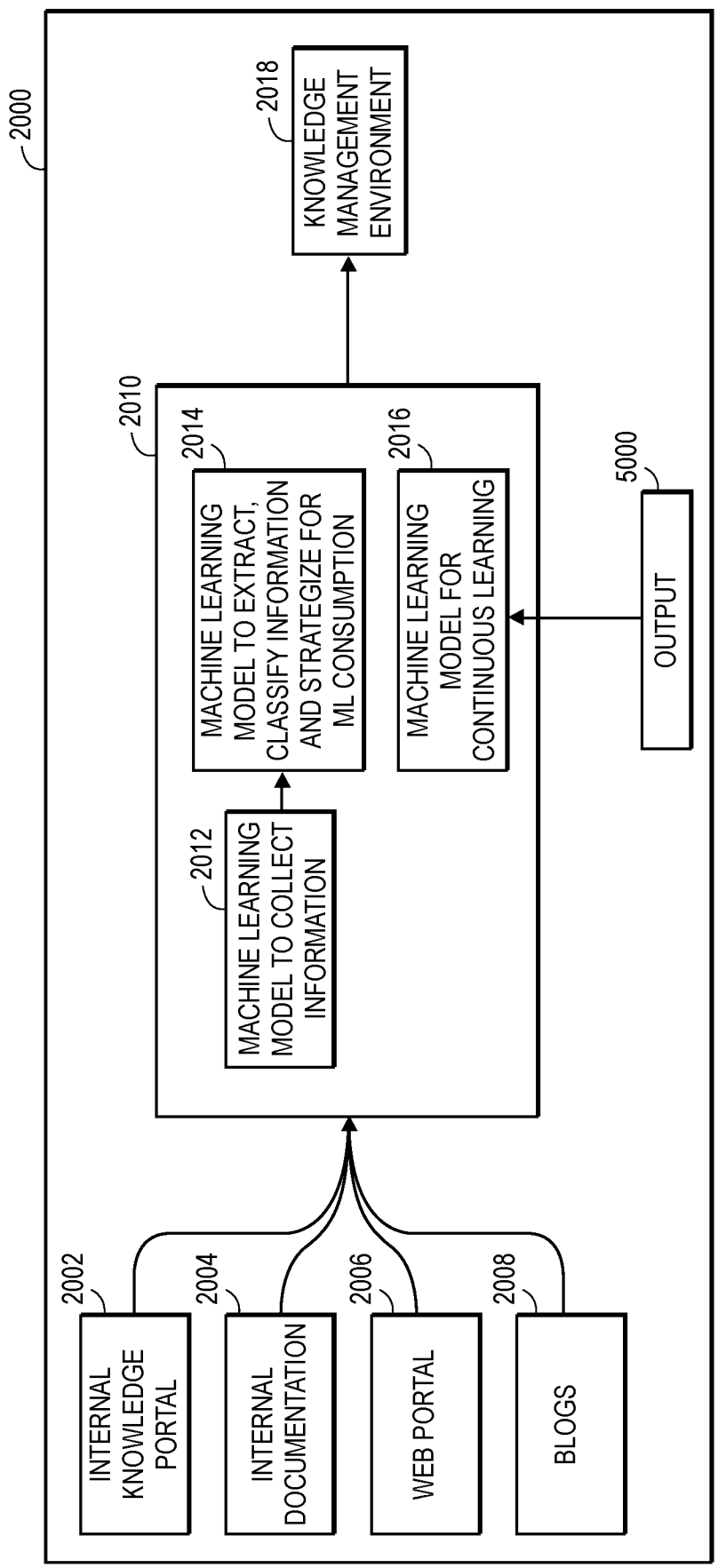
FIG. 2C depicts an exemplary block flow diagram depicting a detail view of receiving information in the knowledge management environment with respect to FIG. 2A, according to some aspects.

FIG. 2C depicts an exemplary block flow diagram depicting a detail view of receiving information in the knowledge management environment at block 2000 of the method 200 of FIG. 2A, according to some aspects. The method 200 may include continuously ingesting data from internal and external data sources including an internal knowledge portal (block 2002), internal documentation (block 2004), a web portal (block 2006) and one or more blogs (block 2008). The internal knowledge portal data source at block 2002 can be a data source that codifies historical enterprise expertise regarding approaches and solutions (e.g., learnings accumulated over decades of consulting work). Each of the blocks 2010, 2012, 2014 include machine-learning powered continual learning aspects. These machine learning models may be trained using new knowledge/information. For example, training data may include knowledge artifacts collected from internal and external sources. The machine learning models may be translate the knowledge artifacts into code (i.e., codify the data) that is processed by the models at block 3000. In some aspects, block 2000 includes a plurality of trained machine learning models, each trained using different types of solutions (e.g., domain, subdomain, technology, business, etc.). The knowledge management environment at block 2000 may include supervised machine learning techniques (e.g., classification models for pre-defined data sets and key elements, such as proprietary structured data of the consultancy). The knowledge management environment at block 2000 may include unsupervised machine learning techniques (e.g., knowledge located in large documents, wherein unsupervised solutions are used to detect patterns, perform topic modeling, perform data cleaning, etc.).

The knowledge management environment at block 2000 codifies knowledge using one or more trained machine learning models based on classifications at the 1000 block. The one or more living documents of the block 2000 are both inputs and outputs of the block 5000. The machine learning models in block 2000 connect the dots between business and technology, and blend them in ways that generate/update living documents using continuous improvement, as discussed herein. As noted above, especially in a large client setting, documentation is extremely important for tasks (e.g., performing a cloud migration and maintenance of the environment on an ongoing basis). Thus, one of the strong advantages of the present techniques is to provide cloud-agnostic, technology-agnostic and industry-agnostic best practice documents that are informed by pattern recognition and underpinned/supported by upkeep of the knowledge management environment based on historical successes, with continually-enriched knowledge outputs produced by machine learning models.

A further advantage of the present techniques is that the living documents generated/updated are relevant to the future of business/technological problems rather than being reactive (i.e., waiting for problems to occur). Specifically, challenges within consultancies are generally driven by limits of time, complexity, headcounts and budgets. These are challenges within the firm and externally with clients. The present techniques improve knowledge management processes by making them faster and broader, and generate knowledge based on collected information automatically. This is significantly more performant than human-based collection, especially at scale. Further blending this information with past information and continuously updating the living documents further improves efficiencies. Without machine learning, the consultancy cannot practically handle or understand the volume of projects or get access to information in time sufficient to practically create a living document that is continuously improved and usable by consultants. On the other hand, the living document can be used internally to improve business processes, technology processes, and for external consultants. For example, a consultant may plug in and fill parameters, variables, and connect dots between internal complexities, external ecosystem, relationship w/other businesses, etc. and then receive codified experience/data. The consultant does not need to spend any time manually searching or analyzing knowledge in the knowledge management environment. Further, the client can discuss the living document with the client, or provide some or the entire living document as a visionary document/systematic instruction to enable the client to address problems themselves.

Updating the living document may include cascading updates to other existing living documents. For example, the method 200 may include updating a first living document to include domain knowledge corresponding to recommended steps, to include customer recommendations, across one or more domain knowledge to one or more related living documents, to bring the related living documents up to date. The method 200 may determine which living documents are the related living documents by analyzing the first living document or by access to an external source (e.g., a database table linking living documents).

The method 200 may include processing the ingested data using machine learning models (block 2010). In the depicted aspect, method 200 may process the ingested data using a trained information collection machine learning model to generate codified information (block 2012). The method 200 may include inputting the codified information using a trained extraction and classification machine learning model (block 2014). The method 200 may include receiving output in a trained continuous learning machine learning model (block 2016). The trained information collection machine learning model may be trained to collect information from the data sources 2002, 2004, 2006 and 2008. The trained extraction and classification machine learning model may be trained to extract and classify information and strategize it for consumption by further machine learning models. The trained continuous learning machine learning model may continuously learn based on updates (e.g., new services or information) made available from the data sources at blocks 2002, 2004, 2006 and 2008 and the output at block 5000. The trained continuous learning machine learning model at block 2016 may generate one or more indications of inefficiencies and propose better solutions over time.

The machine learning models at block 2010 may generate one or more outputs that may be stored in a knowledge management repository (block 2018) of the knowledge management environment at block 2000. For example, the information generated at block 2018 may be stored in an electronic database, such as the database 126 of FIG. 1, and used to learn approaches and solutions to different types of problems across domains that are implemented through different technologies.

Figure 3A:
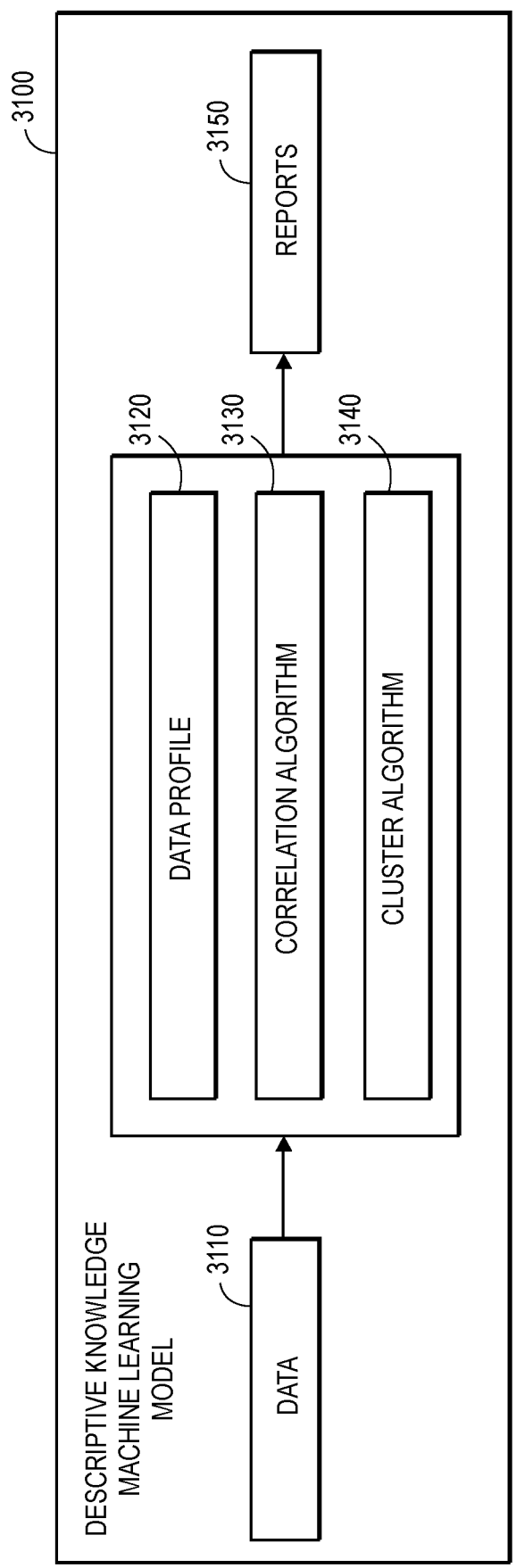
FIG. 3A depicts a block flow diagram of a trained descriptive knowledge machine learning model, according to some aspects.

FIG. 3A depicts a block flow diagram of a trained descriptive knowledge machine learning model (block 3100). The trained descriptive knowledge machine learning model at block 3100 may correspond to the descriptive knowledge model at block 3000 of FIG. 2A. The descriptive knowledge machine learning model at block 3100 is a building block of the knowledge artificial intelligence model at block 3000, and may process data from various sources to understand what has happened by profiling the data (block 3120). The descriptive knowledge machine learning model may identify patterns and determine correlations between data and outcomes (block 3130). The descriptive knowledge model may cluster the data into groups based on different features using unsupervised machine learning (block 3140). The descriptive knowledge machine learning model may generate one or more reports (block 3150).

Figure 3B:
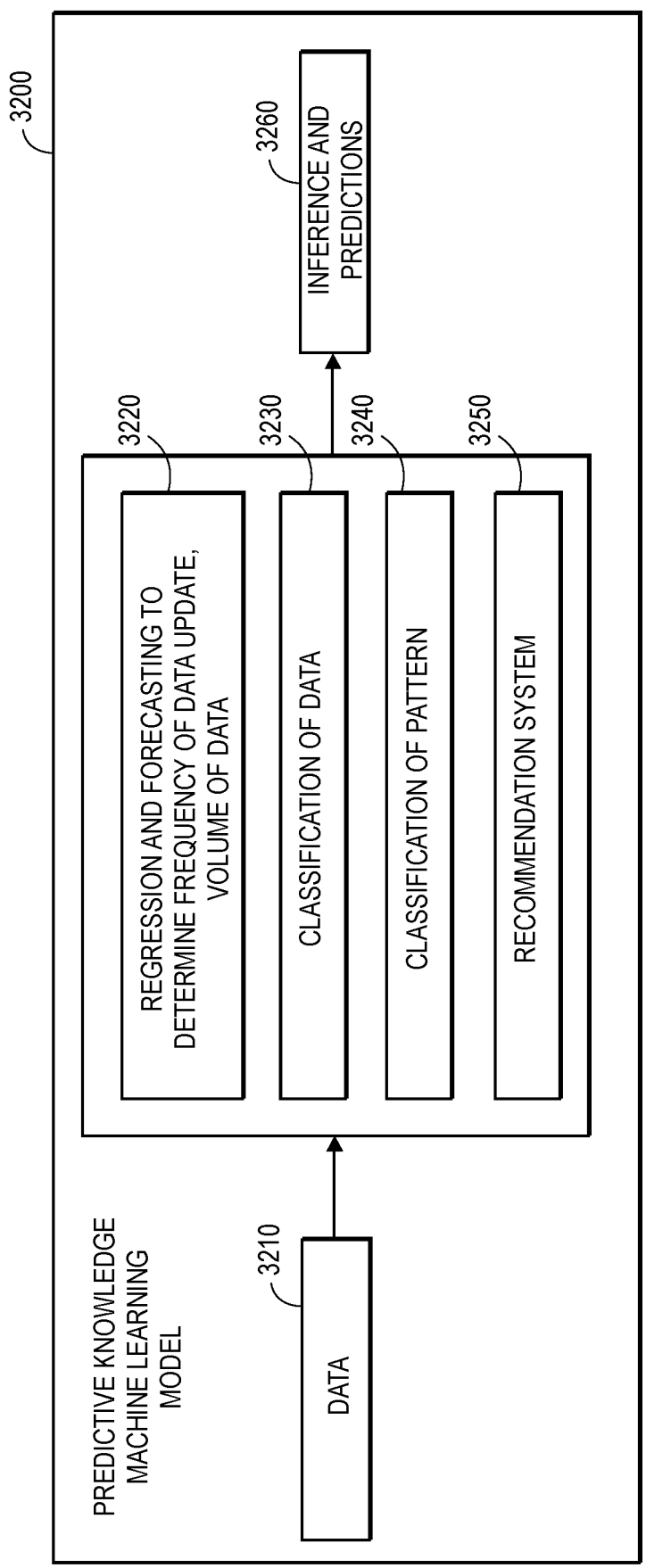
FIG. 3B depicts a block flow diagram of a trained predictive knowledge machine learning model, according to some aspects.

FIG. 3B depicts a block flow diagram of a trained predictive knowledge machine learning model (block 3200). The predictive knowledge machine learning model may predict future outcomes based on data inputs (block 3210). The predictive knowledge machine learning model may generate predictions/forecasts. The predictive knowledge machine learning model may determine frequency of data updates and volume of data (block 3220). The predictive knowledge machine learning model may classify data (block 3230) and classify different patterns (block 3240). In some aspects, the predictive knowledge machine learning model may include a recommendation system (block 3250). The recommendation system may provide recommendation for data solutions.

Figure 3C:
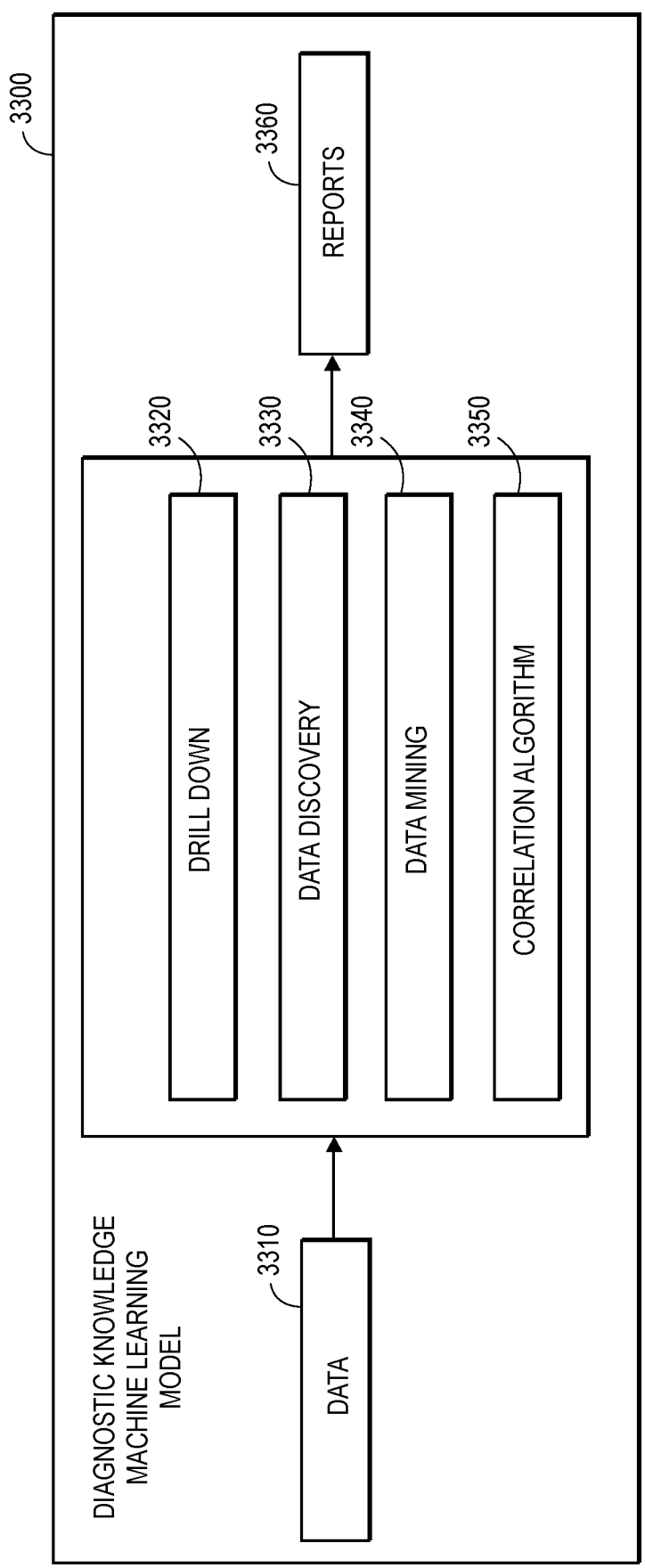
FIG. 3C depicts a block flow diagram of a trained diagnostic knowledge machine learning model, according to some aspects.

FIG. 3C depicts a block flow diagram of a trained diagnostic knowledge machine learning model (block 3300). The diagnostic knowledge machine learning model is a building block of the knowledge artificial intelligence model at block 3000 of FIG. 2A. The diagnostic knowledge machine learning model may process data from various sources to understand and diagnose occurrences (block 3310). The diagnostic knowledge machine learning model may drilling down on the data (block 3320). The diagnostic knowledge machine learning model may include data discovery techniques (block 3330). The diagnostic knowledge machine learning model may include data mining techniques (block 3340). The diagnostic knowledge machine learning model may include data correlation (block 3350). The diagnostic knowledge machine learning model may generate one or more reports (block 3360).

Figure 3D:
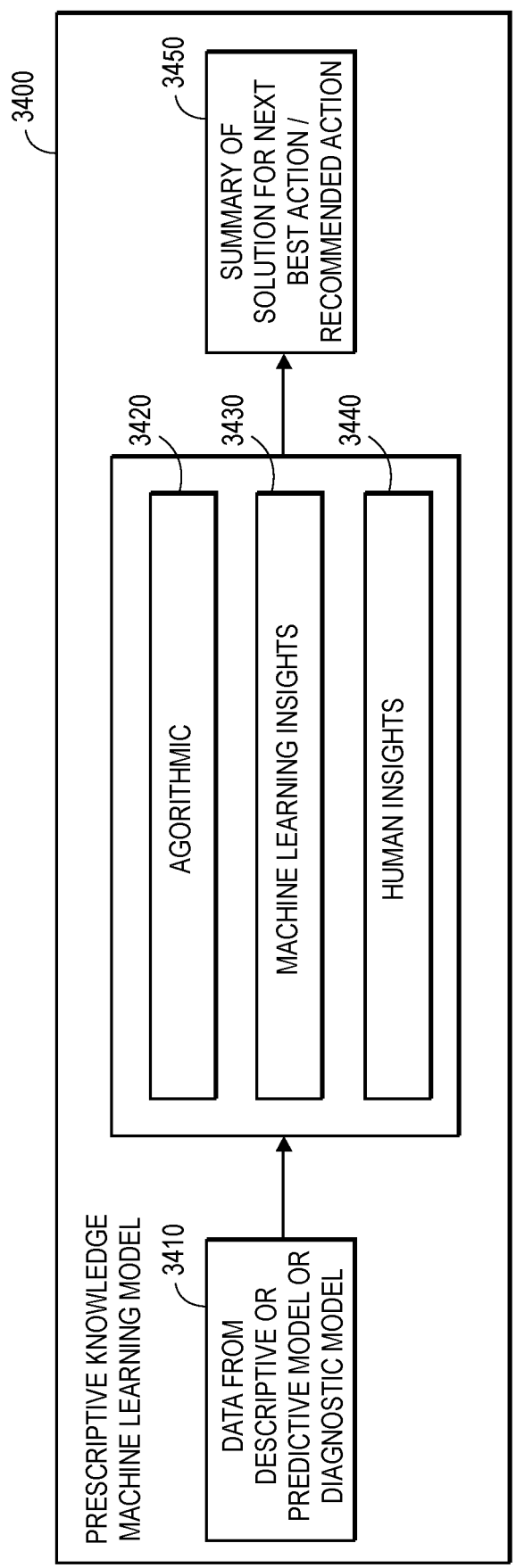
FIG. 3D depicts a block flow diagram of a prescriptive knowledge machine learning model, according to some aspects.

FIG. 3D depicts a block flow diagram of a prescriptive knowledge machine learning model (block 3400). The prescriptive knowledge machine learning model may receive data from the descriptive knowledge machine learning model at block 3100, the predictive knowledge machine learning model at block 3200 and/or the diagnostic knowledge machine learning model at block 3300 (block 3410). The prescriptive knowledge machine learning model may process algorithmic knowledge (block 3420), insights generated from machine learning models (block 3430) and/or human insights (block 3440) to generate a prescription to showcase the next best action or recommended action based on the data from descriptive, diagnostic and predictive model (block 3450).

Exemplary Engine Data Processing

Figure 4A:
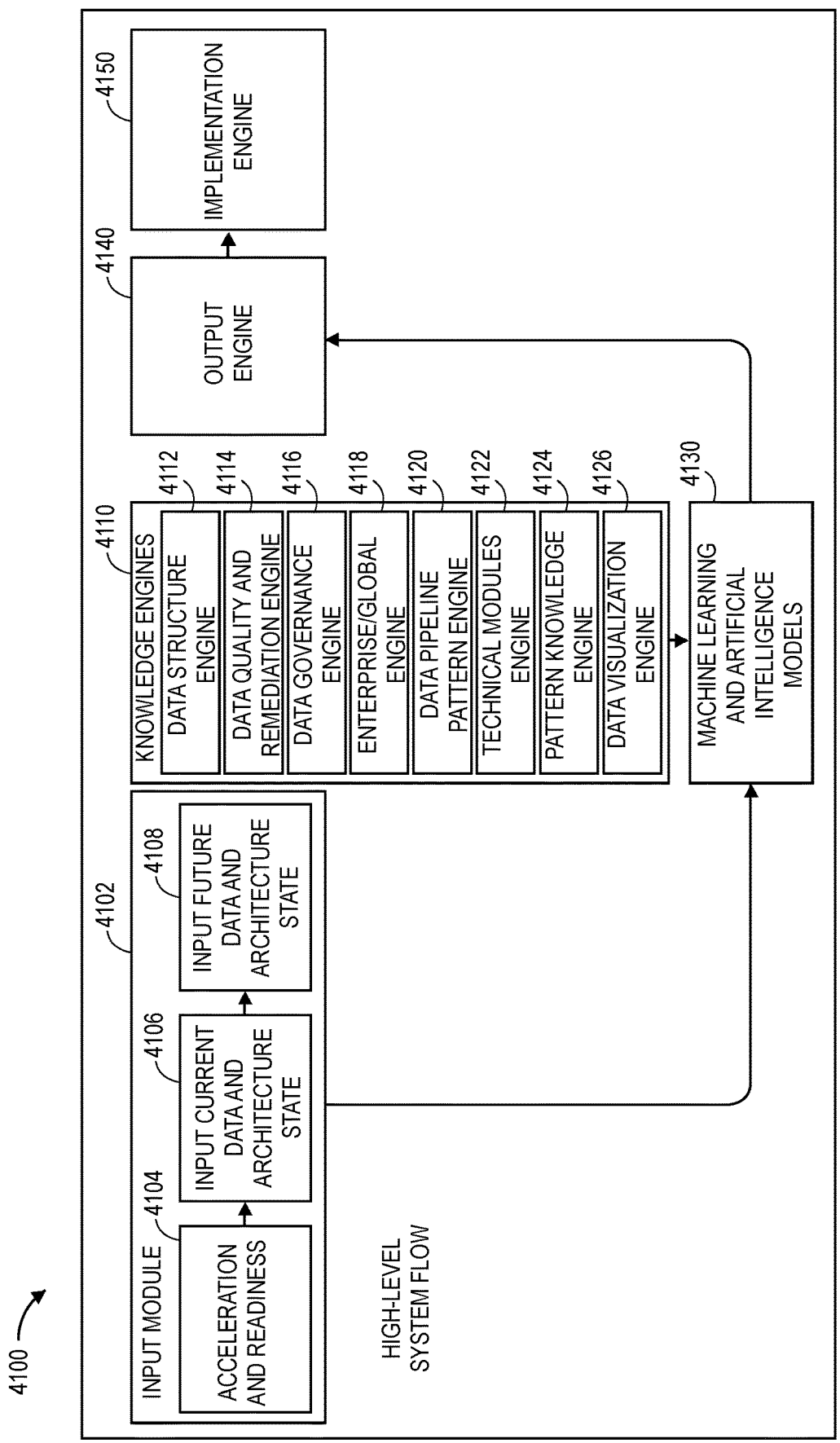
FIG. 4A depicts an exemplary block flow diagram depicting a detail view of leveraging engine data from an intelligent cloud data and technology solutions engine, according to some aspects.

FIG. 4A depicts an exemplary block flow diagram depicting a detail view of leveraging engine data from an intelligent cloud data and technology solutions engine, according to some aspects (block 4100). The block 4100 of FIG. 4A may correspond to the block 4100 of FIG. 2A. Further, in some aspects, the flow at block 4100 may correspond to the techniques discussed in the '521 application at Paras. [0071]-[0082]; and/or to the techniques discussed in the '536 application at Paras. [0072]-[0082]. Thus, the block flow diagram of FIG. 4A may correspond to FIG. 2 of the '521 application and FIG. 2 of the '536 application.

In some aspects, the present techniques may modify or augment aspects of the operation of the external engines. For example, the present techniques may include changes to the method 200 wherein an input module 4102, one or more knowledge engines 4110 and machine learning and artificial intelligence models 4130 are configured to generate an intelligent decision-making model for efficient and effective cloud delivery and cloud transformations. The method 200 may modify and/or operate (e.g., parameterize) a central data structure engine 4112, a data quality and remediation engine 4114, a data governance engine 4116, an enterprise/global engine 4118, a data pipeline pattern engine 4120, a technical modules engine 4122, a pattern knowledge engine 4124, and/or a data visualization engine 4126. One or more of these engines may be configured differently from the method 200 of the '536 application, for example.

In some aspects, the method 200 may include continuously updating using one or more machine learning models. In some aspects, the term "continuous" may mean periodical (e.g., once per second, or more or less frequently). In some aspects, the method 200 may perform continuous updates using an event loop or other low latency technique, such that the updates appear to be real-time, or near-real-time. The continuous updates may include updates from various types of data, including various internal data (e.g., proprietary knowledge, engineering data, etc.) as well as external data (e.g., blogs, videos, news, etc.). The knowledge artificial intelligence model at 3000 may leverage reusable data and technology building blocks and knowledge engine components to recommend a best blend of building blocks to stitch together for an proficient on premise, cloud, or hybrid delivery and transformation, and may periodically assess the economics of cloud technology solutions and recommend alternate options. The knowledge artificial intelligence model at block 3000 may continuously promote innovation by pinpointing inefficiencies and recommending improvement to existing reusable building blocks considering cost efficiencies and time to market. Further, at block 3000, the method 200 may collet user feedback and systematically incorporate it in future decisions and recommendations, while correcting any bias that may had been introduced in the system. The method 200 may include detecting inefficiencies and triggering opportunities for developing new reusable building blocks to make the solution delivery process even more efficient and cost effective. The method 200 may assess and recommend technical debt removal in existing environments. In general, the output engine 4140 of FIG. 4A may generate a detailed deployment template including detailed step by step documentation to deploy the future state architecture. The implementation engine 4150 may be used by the user to implement manual deployment of the output components in the on-premise or multicloud environment or use the infrastructure as code ready-to-deploy pipelines, which can automatically deploy the components based on a customer's preferred destination (on-premise or cloud platform).

Figure 4B:
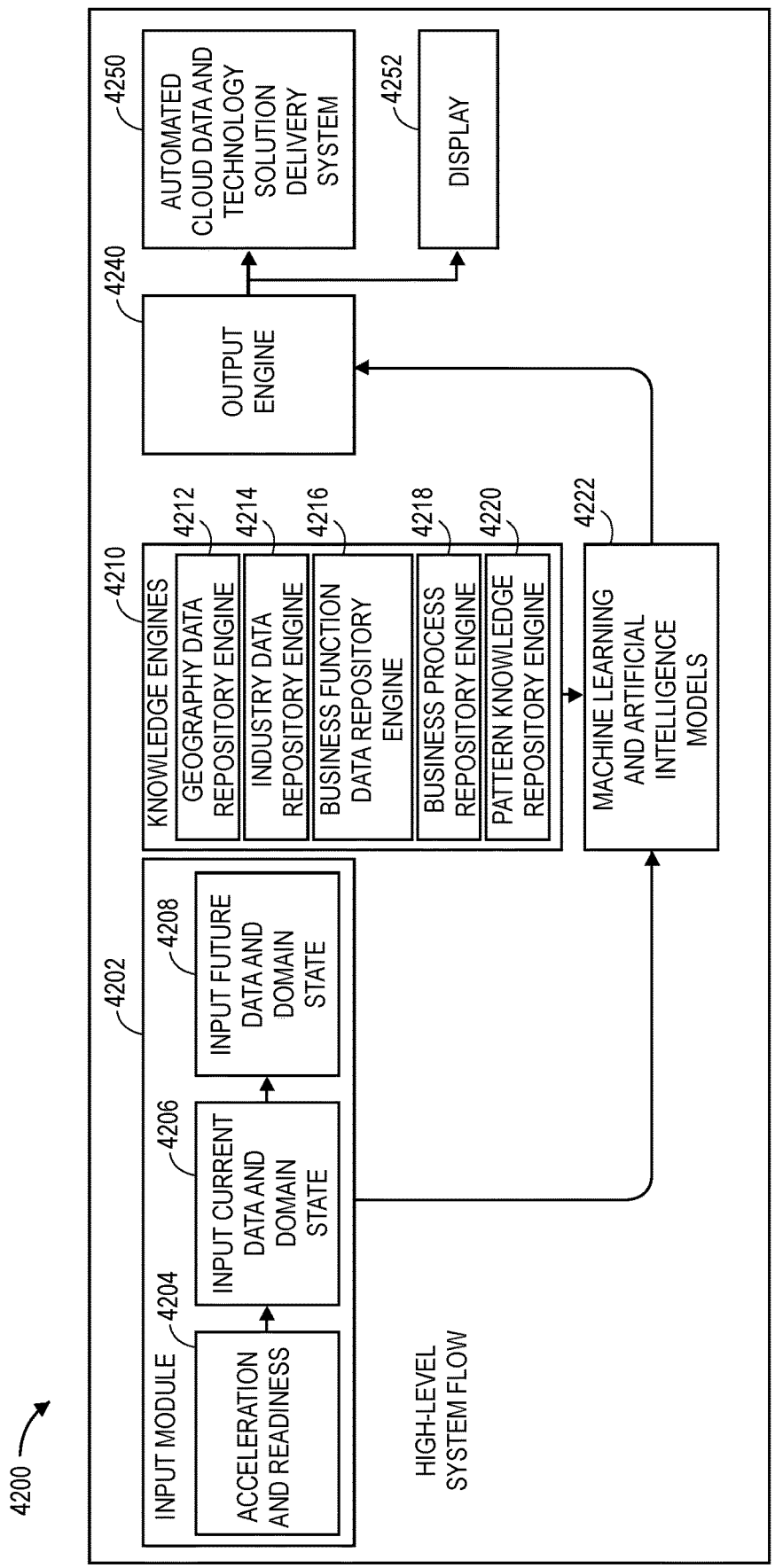
FIG. 4B depicts an exemplary block flow diagram depicting a detail view of leveraging engine data from a smart domain expertise solutions engine, according to some aspects.

FIG. 4B depicts an exemplary block flow diagram depicting a detail view of leveraging engine data from a smart domain expertise solutions engine, according to some aspects (block 4200). The block 4200 of FIG. 4B may correspond to the block 4200 of FIG. 2A. Further, in some aspects, the flow at block 4200 may correspond to the techniques discussed in the '743 application at Paras. [0068]-[0080]. Thus, the block flow diagram of FIG. 4A may correspond to FIG. 2 of the '743 application.

In some aspects, the present techniques include receiving output from one or more machine learning models operated at the 4200 block. Specifically, the method 200 may include contributing to an intelligent domain driven decision making model for efficient and effective cloud delivery and cloud transformations. The method 200 may receive outputs from a geography data repository engine 4212, an industry data repository engine 4214, a function data repository engine 4216, a business processes repository engine 4218 and/or a pattern knowledge repository engine 4220.

The method 200 may include continuously improving and updating a building blocks repository and updating internal and external data sources. One or more machine learning and artificial intelligence models 4222 may leverages reusable data and technology building blocks and knowledge engine components 4212-4222 to recommend mandatory and optional business rules and recommendations based on geography, industry, function, business processes, etc. An output engine 4240 may generate a summary of mandatory and optional recommendations to proceed with a business use case and a corresponding template. The output engine 4240 may also provide a dashboard interface to assess what-if use cases, which may be further supplemented with a narrative summary of what-if use cases.

Figure 4C:
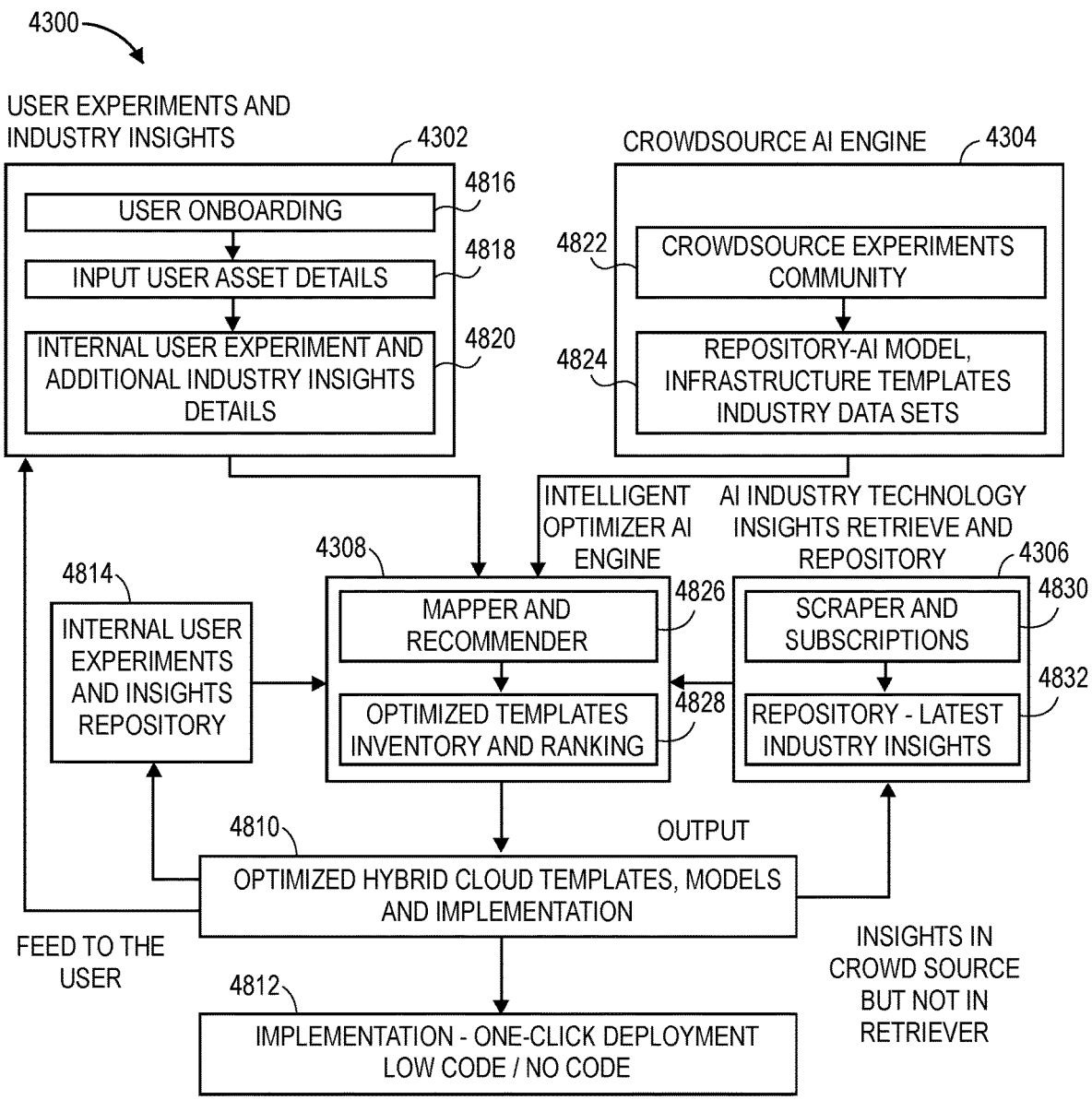
FIG. 4C depicts an exemplary block flow diagram depicting a detail view of leveraging engine data from an AI-driven experimentation engine, according to some aspects.

FIG. 4C depicts an exemplary block flow diagram depicting a detail view of leveraging engine data from an AI-driven experimentation engine, according to some aspects (block 4300). The block 4300 of FIG. 4C may correspond to the block 4300 of FIG. 2A. Further, in some aspects, the flow at block 4300 may correspond to the techniques discussed in the '829 application at Paras. [0064]-[0076]. Thus, the block flow diagram of FIG. 4A may correspond to FIG. 1B of the '829 application.

The method 200 may include user onboarding into a mixed reality-enabled sandbox environment (e.g., an interaction program) that continuously learns and adapts on different user inputs, environment and trends and auto fills a template for an existing user with past experiments, scores and rankings. The method 200 may initiate an AI engine and may conduct new experiments based on user system requests to input user asset details. The method may receive internal user experiment details and/or industry insight details (block 4302), and initiate crowdsourced community experiments (block 4304), wherein the community includes a set of open source contributors who actively participate and contribute to the community. A mixed reality-enabled sandbox environment may provide the crowdsource users a space to experiment and contribute. The crowdsource users may access open source repositories, experiment with ideas and contribute to the community. FIG. 4C may include a crowd contributor profile that shows a list of experiments conducted by each contributor and a current rank in the community (block 4814). The method 200 may include generating a universal database of models and repositories and the infrastructure used. The method 200 may include generating a ready to use template based for each model (block 4810).

The method 200 may further include retrieving and/or receiving the new added AI model repositories, industry data sets, infrastructure used addition/changes (e.g., from the web) (block 4306). The method 200 may include indexing and classifying the new AI model repositories. The method may include continuous learning and self-cleansing of one or more machine learning models using crowdsource community inputs (block 4308). Specifically, the method 200 may include creating best ranked optimized ready to use templates. A mapper and recommender program may receive inputs from the crowdsource engine at block 4340 and user experiments at block 4302, and compare the inputs using the model to score and rank the inputs.

The method 200 may include blending additional AI industry inputs (block 4306), and creating optimized templates according to the determined ranks. The method 200 may include outputting the best ranked model template to the user (block 4810). The method 200 may include generating a one-click deployment in an AI driven continuous improvement/continuous delivery pipeline that self-cleanses and learns from previous deployments, while enhancing itself in terms of scalability, reliability and fault tolerance.

In some aspects, the engine data from the intelligent cloud data and technology solutions module at block 4100 may correspond to data generated by machine learning techniques of the '521 application and/or techniques of the '536 application. In some aspects, the engine data from the smart domain module expertise solutions module at block 4200 may correspond to data generated by machine learning techniques of the '743 application. In some aspects, the engine data from the AI-driven experimentation module at block 4300 may correspond to data generated by machine learning techniques of the '829 application. In some aspects, the engine data from the security solutions module at block 4400 may correspond to data generated by other techniques (e.g., a proprietary security solution of the consultancy-operator). Thus, advantageously, the present techniques improve computer-implemented knowledge management practices and techniques by informing the models of the 3000 block using data highly-refined by other machine learning techniques.

The combination of the 1000, 2000 and 4000 blocks may classify and break the user's problem into parameters and variables that allows the consultancy to better classify data, leading to significantly better living document generation. In some aspects, a target cloud environment (e.g., hybrid cloud, public cloud, etc.) can be an input parameter such that the living document is based on the cloud type. Further, the user's input parameters and variables may include business volumes/business data, user base (client's customer base/stats), e.g., transformation for a bank—size, e.g., can inform the knowledge needed for transformation. The problem statement may be the same, but throughput, volumes, characteristics, business volumes, etc. may determine type of solution and knowledge used for the solution delivery. Each of these parameters may be provided to a trained machine learning model to generate a suitable living document. Having customers define the complexity of their current environment is key and understanding it is extremely important. Collecting this information specifically is important to model effectiveness and convincingness to the client.

Figure 5:
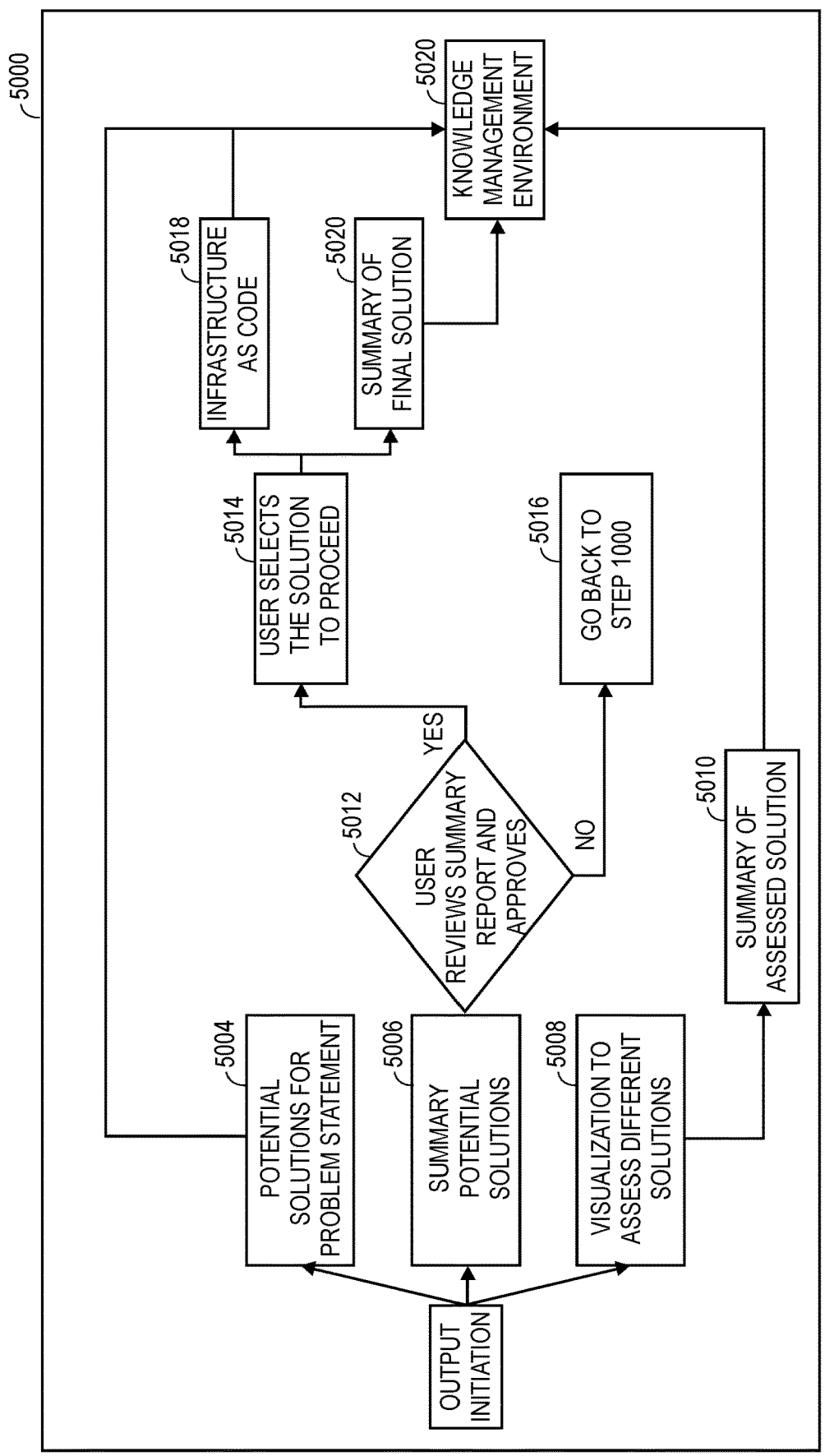
FIG. 5 depicts an exemplary block flow diagram depicting a detail view of populating a knowledge management environment with one or more living documents, according to some aspects.

FIG. 5 depicts an exemplary block flow diagram depicting a detail view of populating a knowledge management environment with one or more living documents, according to some aspects (block 5000). The method 200 includes receiving an output initiation command (block 5002). The method 200 may include receiving one or more problem solutions and problem statements as generated by the NLP models discussed above (block 5004). The method 200 may include receiving one or more potential solution summaries (block 5006). The method 200 may include generating one or more visualizations to assess different solutions (block 5008), and generating a summary of an assessed solution (block 5010). The method 200 may include receiving a user response regarding the one or more potential solutions (block 5012). When the user declines the solution, control flow may return to the block 1000 (block 5016). When the user selects the solution, the method 200 may include one or both of (i) generating infrastructure as code (block 5018), and generating a summary of the final solution as a living s). The living document may include executing code/solution, and/or an aspirational goals, vision, strategy, business processes, schematics, etc. In some aspects, the method 200 may include storing the living document in the knowledge management environment (block 2000). In some aspects, the living documents include high level strategy documents, design documents, scripting documents, data management documents, structured documents (e.g., XML), self-describing APIs customized for specific industries, etc.

The output engine at block 5000 is a self-generating and living knowledge ecosystem that gets continually improvised with AI/ML, generates the potential solutions for problem statement and gets detailed infrastructure as code templates to trigger intelligent deployments. The summary of the final solution will provide business and technology guidance (i.e., one or more living documents) and infrastructure as code that will generate the template of AI enabled intelligent deployment. The blocks 5004, 5010, 5018 and 5020 may continuously feed to block 2000 so that the knowledge management environment documents are living documents that are continuously improving over time. In particular, the method 200 may include one or more potential solutions, summaries and visualizations in the one or more living documents, which may flow to the knowledge management environment. Including this information enables continuous improvement through a cycle of receiving knowledge from the knowledge management environment at block 2000, along with information from other sources such as at block 1000, block 4000. This information can be input into block 3000 to determine what happened in past, to determine best solutions/next actions for a given solution, and diagnostics such as accuracy, bias and fairness. The one or more living documents may be repeatedly predicted, creating cycle of innovation and maintaining the latest information for consultants and users.

In some aspects, the method 200 may include expertise identification. For example, the block 5000 may include instructions that when executed cause a computer to analyze one or more living documents and/or linked documents (e.g., a whitepaper) to extract expert information. The expert information may be stored in a database and associated with one or more codified problem (e.g., a consulting knowledge management problem). This is an important capability because it enables coupling of knowledge documents (e.g., the one or more living documents) with an expert discovery mechanism that can be used to identify subject matter experts, and to enrich client-facing recommendations and other proposals. In some aspects, the smart domain module expertise solutions module (block 4200) may include one or more trained machine learning models that accept de novo inputs (e.g., one or more electronic documents) and output a set of one or more experts, each having a respective score. The model may be adjusted to output only experts in a specifid domain area, for example.

In some aspects, the method 200 may perform the continuous update via a function that accepts as input a new living document (e.g., generated at block 2000). The function may retrieve an existing living document, if any, that corresponds to the new living document. The function may compare the new and existing living documents, and in some cases, highlight what improved, how much improved using rating information from the block 2000. The changed information may be stored in the existing living document (e.g., in the electronic database of FIG. 1) or stored separately, as a delta. The continuous update function may identify solutions that can be used, and score them. The continuous update function may also, in some aspects, collect in-process feedback from customers regarding whether a given solution worked successfully. The indication of success from the customer may be compared to existing living documents, to determine whether those documents are correct.

Exemplary Problems and Solutions

In one example, a company looking to transform their people and finance operations typically go through enterprise resource planning (ERP) transformation e.g., moving from legacy based systems or on-premise systems to cloud based systems such as SAP Success Factors. However, since industry requirements and every organization's HR and finance practices are unique in this space, it is quite a challenging task to generalize. Here, the method 200 can help identify the best migration strategy for ERP transformation i.e. possible industry specific ERP solutions, target state architecture, migration plan including business process transformation, prioritized use cases, data management strategy/information architecture, etc. In particular, the knowledge management environment-based recommendation engine can provide more precise options to facilitate both business and technology transformations required for the success of ERP transformation.

In another example, a team of consultants might work on a cloud transformation journey for a retail enterprise to move their workloads from an on-premise data center to a Cloud Platform. The consultants may have little knowledge about relevant business challenges, technical complexity and the client's market. The expertise of each problem required to be solved to perform the cloud transformation may be very specific to the industry/domain e.g., moving to cloud for an industrial company vs. consumer packaged goods. In this example, the method 200 may be used to generate the solution for specific industry or domain along with one or more living documents for the knowledge management environment.

In another example, a brick and mortar retail company may seek to set up an online marketplace experience that is truly omnichannel for their customers i.e. based on the browsing/purchase history in stores, where their online experience is fully personalized (and vice versa). The consultancy may recognize that this technology solutions is generalizable to many other clients, and thus, the proposed solution can leverage the knowledge management environment to propose various solution components e.g., right-sized cloud architecture for online presence, GTM strategies for launching the marketplace, seamless journeys for customers that span physical and online etc. The knowledge management environment may leverage the customer purchase data to define specific patterns that would help the company balance their focus across channels.

In another example, a high tech company may seek to optimize their call center operations. Their call center support costs have been rising yet at the same time their customer satisfaction has been declining. In such a situation, the method 200 may be used to identify relevant patterns for call centers that support other high tech companies. Based on that learning, the consultancy may explore various possible levers to improve the return-on-investment of the call centers e.g., what are the right footprint locations for the call centers, typical levers to improve call center specialist productivity, rationalizing the products that the call centers should be actively supporting, identifying the areas to provide automated services that would reduce manual needs, etc.

In another example, the present techniques may help a company performing a legacy modernization (e.g. mainframe modernization). Many companies, especially in the financial industry, still run their core systems on mainframes. Mainframe migrations require breaking up and managing end-to-end migrations with infrastructure, software and tools to refactor and transform legacy applications. The present techniques may process historical migrations using one or more trained machine learning models to improve mainframe migration and modernization efficiencies.

In another example, the present techniques may improve hybrid workplace transformations. During the Sars-CoV-2 pandemic, acceleration of hybrid working models with have created a whole set of new opportunities and challenges for enterprises. In particular, enabling connectivity and efficient collaboration in this paradigm requires a very different level of thinking than traditional office based work models. Most companies are going through this learning curve currently. As different enterprises create this hybrid workplace model (including technology, people and processes), feeding knowledge into the learning based knowledge management environment enables the present techniques to build a 'distinctive' repository for recommending various design choices for hybrid workplace ecosystems e.g., what workplace technology should a high tech company with mostly remote workforce choose vs. a hybrid workforce company.

Many complications exist regarding the above examples, including not only technology changes, but also business process changes. For example, each ERP transformation may include multiple solutions and multiple opportunities for transformations, resulting in a very challenging and complicated task. Thus, having knowledge collected from previous experiences and information processing as part of the knowledge management environment helps provide multiple solutions for appropriate problems that the client brings to the consultancy. Taking any transformation in the human resources space or financial services space, each organization begins a transformation for various reasons, sometimes vary different. For example, some organizations want process efficiency. Some want to digitize an entire experience. Still others want some mix of both. Thus, the present techniques enable the consultant to nimbly serve the needs to clients that require unique solutions based on exact problems/needs of the customer and past experience. Further, the present techniques enable the consultancy to identify and infer problems from the client, and to apply the right solution to build using the model validation approach discussed herein. Further, the consultancy can provide the client with a number of proposed options, and to weigh the benefits of each based on based on client needs, and based on past experience and knowledge gained in these spaces (e.g., wherein specific industry processes inform the related living documents (e.g., healthcare vs finance)).

The present techniques are also applicable to assisting clients to embrace future tech. For example, in addition to the ongoing legacy modernization discussed above, there is a dawning realization that today's digital is tomorrow's analog. Brick and mortar stores are transitioning in some cases to being fully/partially digital. These are not necessarily migrations, but probably better thought of as building out new businesses (i.e., building digital businesses that are adjacent to physical businesses). The present techniques advantageously assist clients in extending to new and emerging spaces such as AR/VR, quantum, metaverse, blockchain, and Web-3. As clients move from web-2 to web-3 paradigm, and from a platform economy to a token-based economy, delivering appropriate knowledge management in relation to that transition of every business in every industry is a herculean task. The present techniques provide an answer to the needed continued processes for improving logic in the form of living documents, to cultivate, curate, distribute and maintain (continuously) knowledge in a broad context as a firm. Whenever there is a big jump in technology, there is a need for knowledge describing for the jump, for keeping up with jump, and for continuing to learn from the jump.

Additional Considerations

With the foregoing, users whose data is being collected and/or utilized may first opt-in. After a user provides affirmative consent, data may be collected from the user's device (e.g., a mobile computing device). In other embodiments, deployment and use of neural network models at a client or user device may have the benefit of removing any concerns of privacy or anonymity, by removing the need to send any personal or private data to a remote server.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or "an one aspect" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be con-figured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partial-ly, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for the method and systems described herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method for improving efficiency and consistency of knowledge management living documents, the method comprising: receiving, via one or more processors, one or more user inputs including one or more problems and associated respective parameters and/or variables; receiving, via one or more processors, codified knowledge management information from a knowledge management environment; receiving, via one or more processors, from one or more engines, respective engine data; and processing, via one or more processors, the one or more user inputs, the codified knowledge management information and one or more of the respective engine data using one or more trained machine learning models in a knowledge artificial intelligence model to generate an output including one or more living documents.

2. The computer-implemented method of aspect 1, further comprising: providing a customer recommendation based on the generated one or more living documents.

3. The computer-implemented method of aspect 1, further comprising: processing the user inputs including the one or more problems and associated respective parameters and/or variables with a natural language processing model to identify a detailed problem statement, at least one associated parameter and at least one associated variable.

4. The computer-implemented method of aspect 1, wherein processing the one or more user inputs, the codified knowledge management information and the one or more of the respective engine data using the one or more trained machine learning models in the knowledge artificial intelligence model to generate the output including the one or more living documents includes processing the user inputs using a trained information collection machine learning model to generate the codified knowledge management information.

5. The computer-implemented method of aspect 1, wherein the respective engine data includes at least one of (i) intelligent cloud data and technology solutions engine data; (ii) smart domain expertise solutions engine data; (iii) AI-driven experimentation engine data; or (iv) security solutions engine data.

6. The computer-implemented method of aspect 1, further comprising: updating the one or more living documents with new knowledge based on at least one of (i) a user approval; (ii) output of a machine learning information collection model; or (iii) output of a machine learning extraction, classification and strategy model.

7. The computer-implemented method of any of aspects 1-6, wherein updating the one or more living documents with new knowledge is performed continuously.

8. A computing system for improving the efficiency and consistency of knowledge management living documents, comprising: one or more processors; and a memory comprising instructions that, when executed, cause the computing system to: receive, via one or more processors, one or more user inputs including one or more problems and associated respective parameters and/or variables; receive, via one or more processors, codified knowledge management information from a knowledge management environment; receive, via one or more processors, from one or more engines, respective engine data; and process, via one or more processors, the one or more user inputs, the codified knowledge management information and one or more of the respective engine data using one or more trained machine learning models in a knowledge artificial intelligence model to generate an output including one or more living documents.

9. The computing system of aspect 8, the memory comprising further instructions that, when executed, cause the computing system to: provide a customer recommendation based on the generated one or more living documents.

10. The computing system of aspect 8, the memory comprising further instructions that, when executed, cause the computing system to: process the user inputs including the one or more problems and associated respective parameters and/or variables with a natural language processing model to identify a detailed problem statement, at least one associated parameter and at least one associated variable.

11. The computing system of aspect 8, the memory comprising further instructions that, when executed, cause the computing system to: process the user inputs using a trained information collection machine learning model to generate the codified knowledge management information.

12. The computing system of aspect 8, the memory comprising further instructions that, when executed, cause the computing system to: receive at least one of (i) intelligent cloud data and technology solutions engine data; (ii) smart domain expertise solutions engine data; (iii) AI-driven experimentation engine data; or (iv) security solutions engine data.

13. The computing system of aspect 8, the memory comprising further instructions that, when executed, cause the computing system to: update the one or more living documents with new knowledge based on at least one of (i) a user approval; (ii) output of a machine learning information collection model; or (iii) output of a machine learning extraction, classification and strategy model.

14. The computing system of any of aspects 8, the memory comprising further instructions that, when executed, cause the computing system to: analyze the one or more living documents to identify one or more domain experts.

15. A non-transitory computer-readable storage medium comprising executable instructions that, when executed by a processor, cause a computer to: receive, via one or more processors, one or more user inputs including one or more problems and associated respective parameters and/or variables; receive, via one or more processors, codified knowledge management information from a knowledge management environment; receive, via one or more processors, from one or more engines, respective engine data; and process, via one or more processors, the one or more user inputs, the codified knowledge management information and one or more of the respective engine data using one or more trained machine learning models in a knowledge artificial intelligence model to generate an output including one or more living documents.

16. The non-transitory computer-readable storage medium of aspect 15, storing further executable instructions that, when executed, cause a computer to: provide a customer recommendation based on the generated one or more living documents.

17. The non-transitory computer-readable storage medium of aspect 15, comprising further executable instructions that, when executed, cause a computer to: process the user inputs including the one or more problems and associated respective parameters and/or variables with a natural language processing model to identify a detailed problem statement, at least one associated parameter and at least one associated variable.

18. The non-transitory computer-readable storage medium of aspect 15, comprising further executable instructions that, when executed, cause a computer to: process the user inputs using a trained information collection machine learning model to generate the codified knowledge management information.

19. The non-transitory computer-readable storage medium of aspect 15, comprising further executable instructions that, when executed, cause a computer to: receive at least one of (i) intelligent cloud data and technology solutions engine data; (ii) smart domain expertise solutions engine data; (iii) AI-driven experimentation engine data; or (iv) security solutions engine data.

20. The non-transitory computer-readable storage medium of aspect 15, comprising further executable instructions that, when executed, cause a computer to: update the one or more living documents with new knowledge based on at least one of (i) a user approval; (ii) output of a machine learning information collection model; or (iii) output of a machine learning extraction, classification and strategy model.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method for improving efficiency and consistency of knowledge management living documents, the method comprising:
   receiving, via one or more processors, one or more user inputs including one or more problems and associated respective parameters and/or variables;
   receiving, via one or more processors, codified knowledge management information from a knowledge management environment;
   receiving, via one or more processors, from one or more engines, respective engine data; and
   processing, via one or more processors, the one or more user inputs, the codified knowledge management information and one or more of the respective engine data using one or more trained machine learning models in a knowledge artificial intelligence model to generate an output including one or more living documents.

2. The computer-implemented method of claim 1, further comprising:
   providing a customer recommendation based on the generated one or more living documents.

3. The computer-implemented method of claim 1, further comprising:
   processing the user inputs including the one or more problems and associated respective parameters and/or variables with a natural language processing model to identify a detailed problem statement, at least one associated parameter and at least one associated variable.

4. The computer-implemented method of claim 1, wherein processing the one or more user inputs, the codified knowledge management information and the one or more of the respective engine data using the one or more trained machine learning models in the knowledge artificial intelligence model to generate the output including the one or more living documents includes processing the user inputs using a trained information collection machine learning model to generate the codified knowledge management information.

5. The computer-implemented method of claim 1, wherein the respective engine data includes at least one of (i) intelligent cloud data and technology solutions engine data; (ii) smart domain expertise solutions engine data; (iii) AI-driven experimentation engine data; or (iv) security solutions engine data.

6. The computer-implemented method of claim 1, further comprising:
   updating the one or more living documents with new knowledge based on at least one of (i) a user approval; (ii) output of a machine learning information collection model; or (iii) output of a machine learning extraction, classification and strategy model.

7. The computer-implemented method of claim 6, wherein updating the one or more living documents with new knowledge is performed continuously.

8. A computing system for improving the efficiency and consistency of knowledge management living documents, comprising:
   one or more processors; and
   a memory comprising instructions that, when executed, cause the computing system to:
      receive, via one or more processors, one or more user inputs including one or more problems and associated respective parameters and/or variables;
      receive, via one or more processors, codified knowledge management information from a knowledge management environment;
      receive, via one or more processors, from one or more engines, respective engine data; and process, via one or more processors, the one or more user inputs, the codified knowledge management information and one or more of the respective engine data using one or more trained machine learning models in a knowledge artificial intelligence model to generate an output including one or more living documents.

9. The computing system of claim 8, the memory comprising further instructions that, when executed, cause the computing system to:
provide a customer recommendation based on the generated one or more living documents.

10. The computing system of claim 8, the memory comprising further instructions that, when executed, cause the computing system to:
process the user inputs including the one or more problems and associated respective parameters and/or variables with a natural language processing model to identify a detailed problem statement, at least one associated parameter and at least one associated variable.

11. The computing system of claim 8, the memory comprising further instructions that, when executed, cause the computing system to:
process the user inputs using a trained information collection machine learning model to generate the codified knowledge management information.

12. The computing system of claim 8, the memory comprising further instructions that, when executed, cause the computing system to:
receive at least one of (i) intelligent cloud data and technology solutions engine data; (ii) smart domain expertise solutions engine data; (iii) AI-driven experimentation engine data; or (iv) security solutions engine data.

13. The computing system of claim 8, the memory comprising further instructions that, when executed, cause the computing system to:
update the one or more living documents with new knowledge based on at least one of (i) a user approval; (ii) output of a machine learning information collection model; or (iii) output of a machine learning extraction, classification and strategy model.

14. The computing system of claim 8, the memory comprising further instructions that, when executed, cause the computing system to:
analyze the one or more living documents to identify one or more domain experts.

15. A non-transitory computer-readable storage medium comprising executable instructions that, when executed by a processor, cause a computer to:
receive, via one or more processors, one or more user inputs including one or more problems and associated respective parameters and/or variables;
receive, via one or more processors, codified knowledge management information from a knowledge management environment;
receive, via one or more processors, from one or more engines, respective engine data; and
process, via one or more processors, the one or more user inputs, the codified knowledge management information and one or more of the respective engine data using one or more trained machine learning models in a knowledge artificial intelligence model to generate an output including one or more living documents.

16. The non-transitory computer-readable storage medium of claim 15, storing further executable instructions that, when executed, cause a computer to:
provide a customer recommendation based on the generated one or more living documents.

17. The non-transitory computer-readable storage medium of claim 15, comprising further executable instructions that, when executed, cause a computer to:
process the user inputs including the one or more problems and associated respective parameters and/or variables with a natural language processing model to identify a detailed problem statement, at least one associated parameter and at least one associated variable.

18. The non-transitory computer-readable storage medium of claim 15, comprising further executable instructions that, when executed, cause a computer to:
process the user inputs using a trained information collection machine learning model to generate the codified knowledge management information.

19. The non-transitory computer-readable storage medium of claim 15, comprising further executable instructions that, when executed, cause a computer to:
receive at least one of (i) intelligent cloud data and technology solutions engine data; (ii) smart domain expertise solutions engine data; (iii) AI-driven experimentation engine data; or (iv) security solutions engine data.

20. The non-transitory computer-readable storage medium of claim 15, comprising further executable instructions that, when executed, cause a computer to:
update the one or more living documents with new knowledge based on at least one of (i) a user approval; (ii) output of a machine learning information collection model; or (iii) output of a machine learning extraction, classification and strategy model.

* * * * *